United States Patent [19]

Derr et al.

[11] Patent Number: 5,179,695

[45] Date of Patent: Jan. 12, 1993

[54] PROBLEM ANALYSIS OF A NODE COMPUTER WITH ASSISTANCE FROM A CENTRAL SITE

[75] Inventors: Andrew G. Derr, Endicott; Richard J. Poliquin, Endwell, both of N.Y.

[73] Assignee: International Business Machines Corporation, Armonk, N.Y.

[21] Appl. No.: 578,042

[22] Filed: Sep. 4, 1990

[51] Int. Cl.⁵ .............................................. G06F 11/00
[52] U.S. Cl. ................................ 395/575; 364/267.4; 364/267.7; 364/DIG. 1; 371/16.1
[58] Field of Search ............... 371/15.1, 16.1, 29.1; 364/267.4, 267.7; 395/575

[56] References Cited

U.S. PATENT DOCUMENTS

| | | | |
|---|---|---|---|
| 3,692,989 | 9/1972 | Takahashi | 371/11.3 |
| 4,817,092 | 3/1989 | Denny | 371/11 |
| 4,823,343 | 4/1989 | Takahashi | 371/16.1 |
| 4,858,152 | 8/1989 | Estes et al. | 364/550 |
| 4,873,687 | 10/1989 | Breu | 371/8.2 |
| 4,893,307 | 1/1990 | McKay et al. | 370/94.1 |
| 4,972,453 | 11/1990 | Daniel, III et al. | 371/15.1 |

OTHER PUBLICATIONS

"Alert Implementation Guide" Manual, IBM Corp., 1988, Publication #: GC31-6809-0.

Primary Examiner—Charles E. Atkinson
Attorney, Agent, or Firm—Arthur J. Samodovitz

[57] ABSTRACT

A computer network analyzes a problem with a first computer in the network. The network comprises a first program which runs on a second computer and analyzes a problem with the first computer. A second program also runs on the second computer and generates an alert for transmission to the third computer. The alert includes a probable cause category encompassing the problem and a recommendation. The recommendation is to contact a service engineer if the problem requires expertise or resources of the service engineer to correct, and is to establish remote access on site at the third computer of the first program to obtain additional information relating to the cause of the problem if at least a reasonable chance exists that the problem can be corrected by a person at the first computer which person not having service engineering expertise or resources. A third program runs on the third computer and remotely controls the first program to obtain the additional information relating to the cause of the problem if there is at least a reasonable chance that the problem can be corrected by a person at the first computer which person not having service engineering expertise or resources. The additional information includes a recommended test or inspection to determine the cause of the problem.

21 Claims, 6 Drawing Sheets

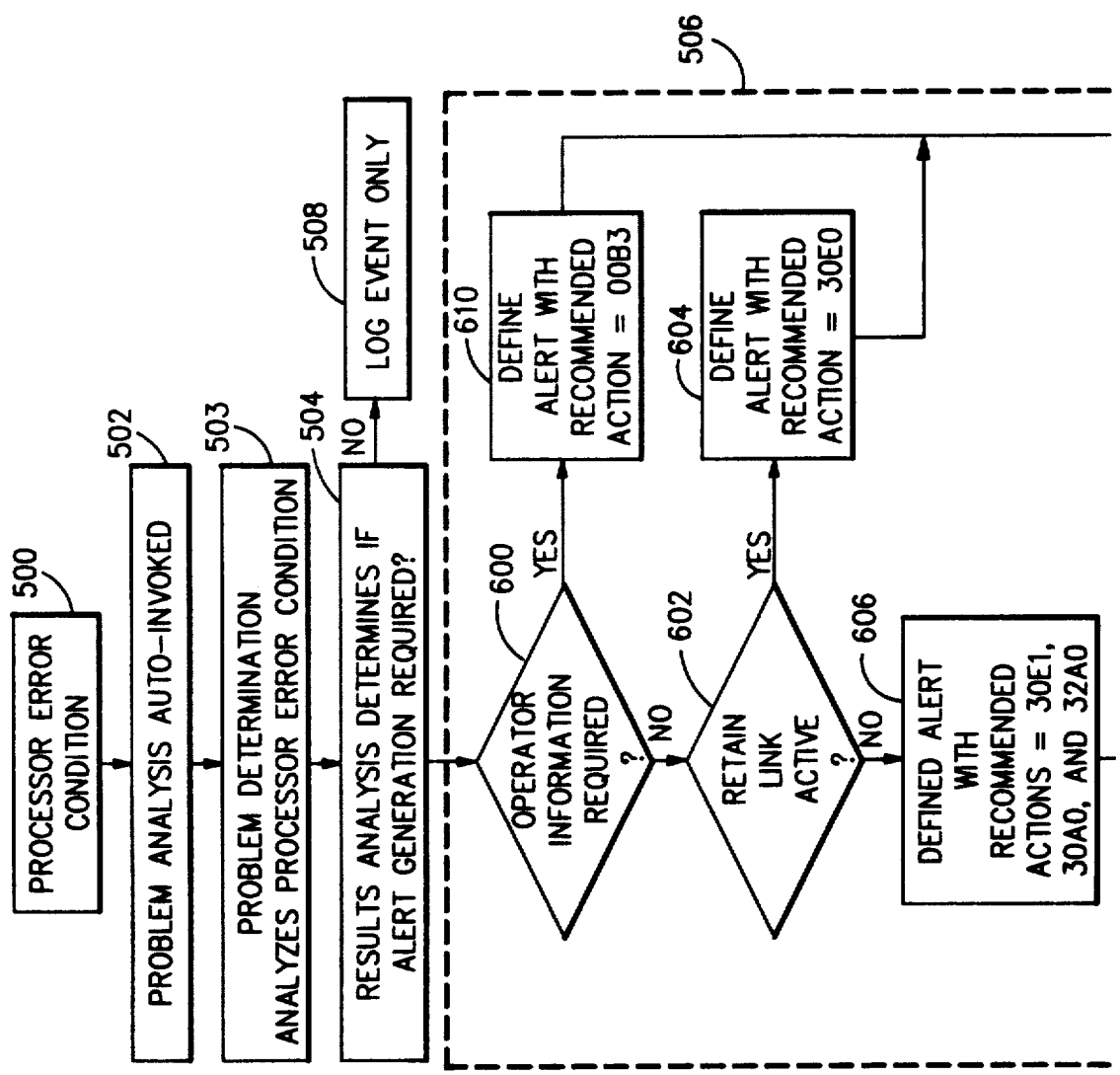
FIG.2(a)A

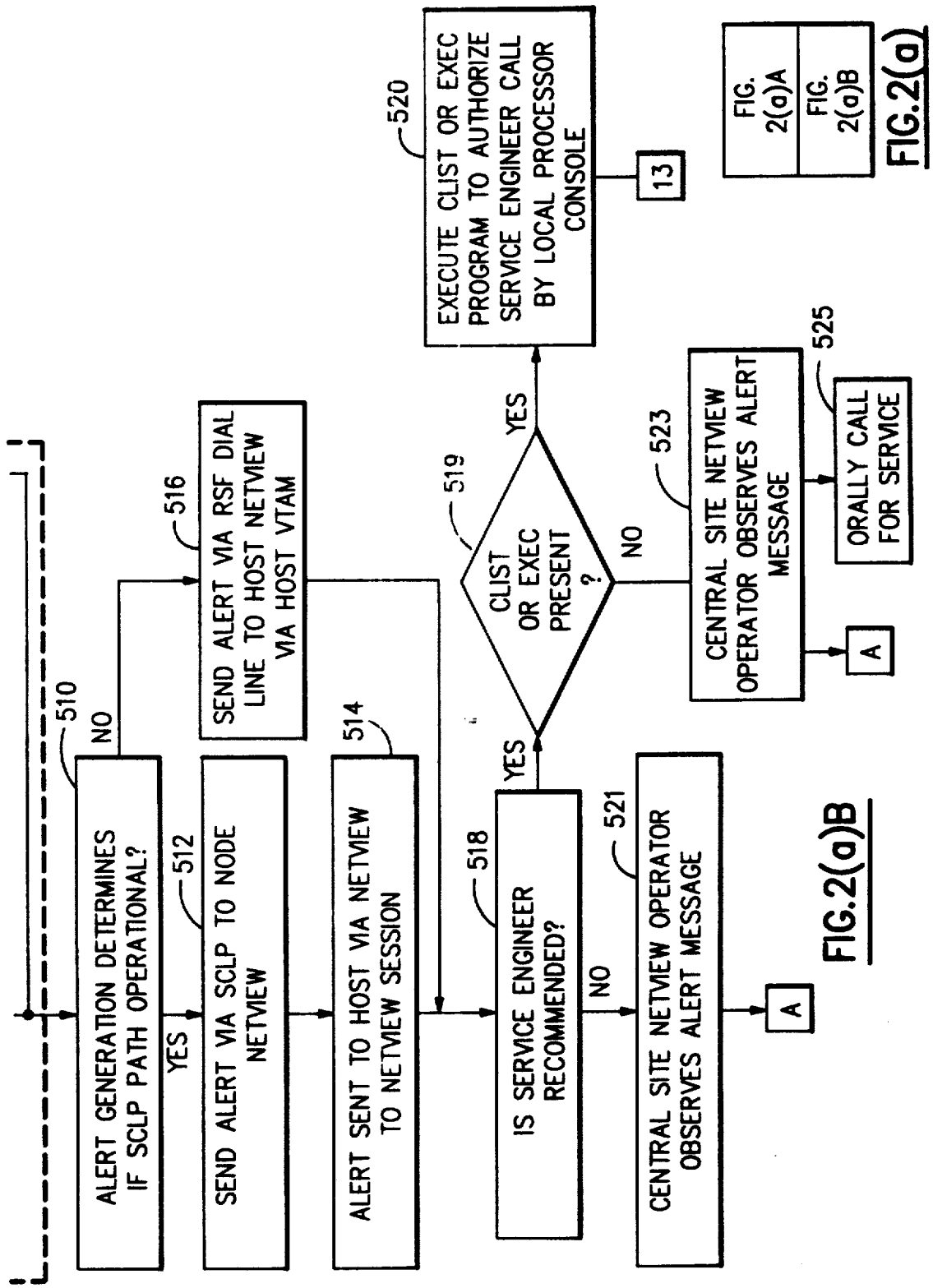

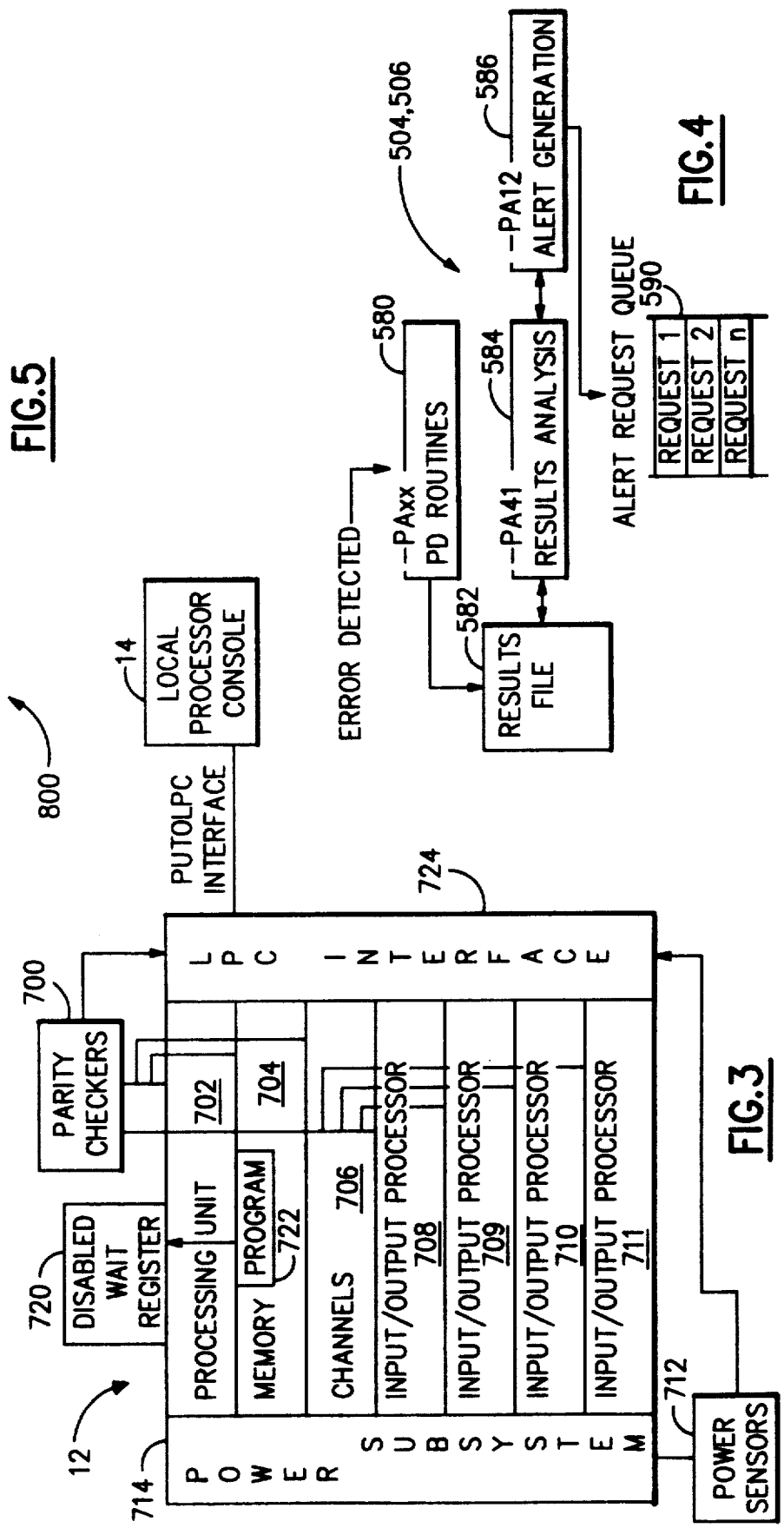

PROBLEM ANALYSIS OF A NODE COMPUTER WITH ASSISTANCE FROM A CENTRAL SITE

BACKGROUND OF THE INVENTION

The invention relates generally to computer systems and networks, and deals more particularly with apparatus and processes for analyzing problems of a node computer with assistance from a central site.

In a prior art IBM AS/400 computer system, when a node computer in a network experiences a problem, the node computer invokes a problem analysis program to identify the problem and then sends an alert to a host computer. The alert includes an identification of the specific problem with the node computer. Then an operator at the central site can take action to correct the problem such as calling a service engineer or a person at the node site. While this system is effective in conveying information to the central site, the problem analysis program at the node is frequently updated to identify additional or different problems. As a result, it is necessary to frequently update the central site program to recognize the additional or different problems.

IBM's prior art system network architecture (SNA) supports the transmission of an alert from such a node to a central site, and then transmission of a request by an operator or application at the central site to the node for further information from the node.

IBM's prior art 4381 computer system includes a local processor console and a remote processor console, and a remote service facility which causes display screens generated by an application running on a local processor console to be displayed at both processor consoles. The remote facility also permits a remote operator to control the application running on a local processor console by keyboard input at the remote processor console. The local processor console ran a problem analysis program when a processor detected an error and stored a result which identified the problem and corrective action that could be taken by the operator. When the operator suspected a problem, the operator could invoke the problem analysis program to obtain the additional information.

A general object of the present invention is to provide a solution directed computer system and process for analyzing problems of a computer node with assistance from a central site.

Another object of the present invention is to provide a system, network and process which are flexible to accommodate program updates at the node which identify additional or different problems without requiring updates to a program running at the central site.

Another object of the present invention is to provide a computer network, system and process of the foregoing type which permit an operator at the central site to have full benefit of resources at the node to solve the problem.

SUMMARY OF THE INVENTION

The invention resides in a computer network for analyzing a problem with a first computer. The network comprises a first program which runs on a second computer and analyzes a problem with the first computer.

A second program also runs on the second computer and generates an alert for transmission to a third computer. The alert includes a probable cause category encompassing the problem and a recommendation. The recommendation is to contact a service engineer if the problem requires expertise or resources of the service engineer to correct, and is to establish remote access on site at the third computer for the first program to obtain additional information relating to the cause of the problem if at least a reasonable chance exists that the problem can be corrected by a person at the first computer which person not having service engineering expertise or resources.

A third program runs on the third computer and remotely controls the first program to obtain the additional information relating to the cause of the problem if there is at least a reasonable chance that the problem can be corrected by a person at the first computer which person not having service engineering expertise or resources. The additional information includes a recommended test or inspection to determine the cause of the problem.

According to one feature of the invention, a fourth program runs on the second computer and automatically responds to the recommendation to call the service engineer. The fourth program is programmable to respond to the recommendation to authorize the second computer to call the service engineer and is programmable to alert an operator at the third computer of the recommendation without authorizing the service engineer call.

BRIEF DESCRIPTION OF THE FIGURES

FIG. 3 is a block diagram illustrating error detection circuitry and programs within the node computer.

FIG. 4 is a flow diagram illustrating processing carried out at the node to build an alert message.

FIG. 5 is a diagram illustrating a format of the alert message of FIG. 4.

DETAILED DESCRIPTION OF THE PREFERRED EMBODIMENTS

Figure 1:
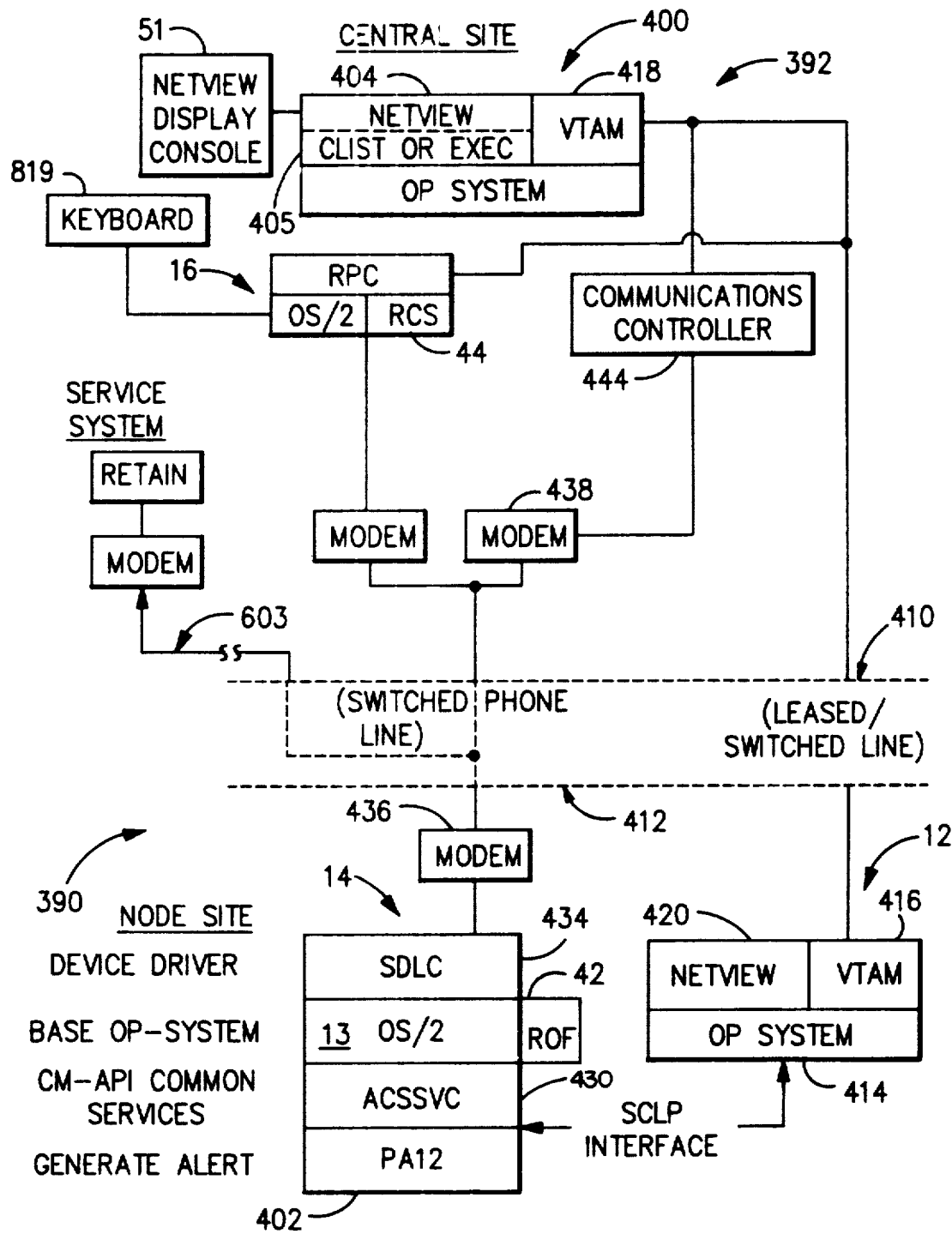
FIG. 1 is a block diagram illustrating a computer network embodying the present invention.

Referring now to the Figures in detail wherein like reference numerals indicate like elements throughout the several views, FIG. 1 illustrates a computer network generally designated 390 according to the present invention. Network 390 comprises a local processor console (LPC) 14 which analyzes a problem with a local or node computer, CEC 12, with assistance from a central or remote site 392. The central site 392 includes a remote processor console (RPC) 16 and a host computer 400. By way of example, the local processor console 14 and the remote processor console 16 each comprises an IBM PS/2 personal computer with an IBM OS/2 operating system, and central host computer 400 and local host computer 12 each comprises an IBM system 370 computer. The two main program components that participate in the analysis of problems are a problem analysis program 402 which runs on the local processor console 14, and a NetView program 404 which runs on host computer 400 at the central site. As described in more detail below with reference to FIG. 2, problem analysis program 402 is invoked by diagnostics circuitry or a diagnostics program (shown in FIG. 3) when the diagnostic circuitry or program detects a problem with the local or node computer 12. Then, problem analysis program 402 (1) generates an alert signal, (2) determines a probable cause category in which the problem falls and a failing part(s) if any, and (3) determines a recommended action to be performed by the central site, and transmits these three information items (and other information as described below) to the central site.

The alert is displayed on NetView display console 51 and comprises a collection of subvectors and associated subfields that provide the aforesaid and other information:

SV01—Date/Time Subvector—indicates date and time that the error occurred. Sourced by problem analysis program.

SV04—SNA Address List Subvector—requests that VTAM communication facility 418 supply the type and name of SNA resources to NetView focal point i.e. central site 392.

SV05—Hierarchy/Resource List Subvector—comprises resource name of the local processor console. This field is sourced by the customer.

SV10—Product Set ID Subvector—comprises all of the following sourced by problem analysis program:
1) Machine Type (four characters);
2) Machine Model (three characters);
3) Plant of Manufacture (two characters); and
4) Serial Number (seven characters).

SV92—Generic Alert Data Subvector—comprises one of the following: (code points sourced from Alerts file):
1) x'1003'—CPC HARDWARE FAILURE;
2) x'2001'—CPC ENTERED HARD WAIT; or
3) x'B100'—SERVICE/REPAIR INFORMATION.

SV93—Probable Causes Subvector—comprises one of the following: (code points sourced from Alerts file):
1) x'0000'—PROCESSOR;
2) x'0002'—VECTOR PROCESSOR;
3) x'0200'—POWER SUBSYSTEM;
4) x'0100'—STORAGE;
5) x'000A'—SERVICE PROCESSOR;
6) x'0506'—CHANNEL SUBSYSTEM;
7) x'6300'—INPUT/OUTPUT DEVICE;
8) x'0040'—INITIAL PROGRAM LOAD;
9) x'2300'—CONNECTION NOT ESTABLISHED; or
10) x'FE00'—UNDETERMINED.

SV94—User Causes Subvector—comprised of SF01 and SF81 subfields.

SV95—Install Causes Subvector—comprised of SF01 and SF81 subfields.

SV96—Failure Causes Subvector—comprised of SF01 and SF81 subfields.

SV97—Undetermined Causes Subvector—comprised of SF81 subfields.

SF01—Probable Causes Subfield—comprises one or more of the following: (code points sourced from Alerts file):
1) x'0006'—PROCESSOR MACHINE CHECK;
2) x'0009'—SYSTEM CHECKSTOP;
3) x'0008'—VECTOR PROCESSOR;
4) x'0200'—POWER SUBSYSTEM;
5) x'0100'—STORAGE;
6) x'000A'—SERVICE PROCESSOR;
7) x'0506'—CHANNEL SUBSYSTEM;
8) x'F0A3'—FAILURE OCCURRED ON (SF82-50, 51, 7D, 7E);
9) x'6300'—INPUT/OUTPUT DEVICE; and/or
10) x'2300'—CONNECTION NOT ESTABLISHED.

SF81—Recommended Actions Subfield—a results analysis program (described below) will determine the recommended action to take based on several pieces of information gathered from the machine. The first is whether a RETAIN link has been activated. If it has, then the recommended action is to authorize service. If the link to Retain fails then the recommended action is to dial the phone number and report the following: problem type, problem number, and FRU list or refcode. If the Retain link is not active, then the recommended action is to contact service representative and report the following: problem type, problem number, and FRU list or refcode.

This subfield comprises one or more of the following:
1) x'00B3'—PERFORM (SF82-7A) PROBLEM DETERMINATION VIA A REMOTE CONSOLE SESSION;
2) x'30A0'—DIAL (SF82-D4) AND REPORT THE MACHINE INFORMATION;
3) x'32A0'—REPORT THE FOLLOWING SF82;
4) x'30E0'—PROVIDE REMOTE SERVICE CALL AUTHORIZATION FOR (SF83 product text); and/or
5) x'30E1'—CONTACT SERVICE REPRESENTATIVE FOR (SF83 product text).

SF82—Detailed Data Sub-Subfield—comprises one or more of the following: (code sub-points sourced from Alerts file):
1) x'50'—CHANNEL ADDRESS number;
2) x'7E'—CHANNEL PATH ID number;
3) x'51'—DEVICE ADDRESS number;
4) x'7D'—SUBCHANNEL NUMBER number;
5) x'7A'—CENTRAL PROCESSOR COMPLEX;
6) x'D4'—TELEPHONE NUMBER number;
7) x'20'—MESSAGE CODE refcode or FRU-list;
8) x'xx'—PROBLEM TYPE type;
9) x'xx'—PROBLEM NUMBER number; and/or
10) x'xx'—PROBLEM MANAGEMENT HARDWARE (PMH) number.

SF83—Product Set ID Index—comprises definition of the failing processor: x'51'—Machine type, model number, and serial number from SV10.

The alert message complies with Systems Network Architecture (SNA) as described in a publication entitled "SNA Formats" published by IBM Corp., publication #GA27-3136. See also "Alert Implementation Guide" published by IBM Corp., publication #GC31-6809.:

The transmission from the local processor console or node 14 to the central site can be made either via a leased/switched telephone line 410 which normally would not incur a telephone charge to the user, or a switched telephone line 412 which would incur a telephone charge to the user. To utilize the leased telephone line 410, the communication is sent via service call logical processor interface (SCLPI) to an operating system 414 of the local host computer 12 and a virtual telecommunication access method (VTAM) communication facility within the local host computer to a VTAM communication facility of the central site host computer. SCLP is a system 370 architected instruction which is executed by operating system 414 to control movement of data from operating system 414 to hardware within CEC 12. VTAM communication facility is described in detail in a publication entitled "VTAM Programming for LU 6.2" by IBM Corp. of Armonk, N.Y., publication #SC30-3400. During this mode of communication, a portion of a NetView program 420 at the node computer 12 provides a communication program function to pass alerts from operating system 414 to VTAM communication facility 416. The NetView programs 404 and 420 are described in detail in publications entitled "NetView Operation Release 2" by IBM Corp., publication #SC30-3364, "Learning About NetView" by IBM Corp., publication #SK2T-0292, Systems Network Architecture Technical Overview by IBM Corp., publication #GC30-3073, "NetView Hardware Problem Determination Reference" by IBM Corp., publication #SC30-3366; and "NetView Operation Scenarios" by IBM Corp., publication #SC30-3376. NetView programs 404 and 420 are substantially the same but can run on different operating systems.

The problem analysis program 402 monitors the status of NetView program 420 and operating system 414 of the local host computer, and when both are available, selects the leased path to avoid the telephone company charge.

However, if the leased telephone line path is not available, then problem analysis program 402 selects the switched telephone line path to send the aforesaid information i.e. alert, probable cause category, and recommended action. This path utilizes a Communication Manager program of the IBM OS/2 operating system 13 and an application program to program interface (APPI) which Communication Manager and APPI are collectively identified by reference numeral 430. The OS/2 operating system is further defined in a publication entitled "IBM OS/2 Standard Edition Version 1.2 Getting Started" publication which is part of a package of publications collectively entitled "OS/2 EE 1.2 End User Pubs" IBM publication #SO1F-0285. The path also comprises synchronous data link connection (SDLC) 434 and a modem 436 to access the switched telephone line 412. Then, the transmission is received by a modem 438 and passed to VTAM communication facility 418 under the control of a communications controller 444.

After receiving the aforesaid transmission from local processor console 14, NetView program 404 can automatically transmit a response, such as to authorize a call to service engineer, to problem analysis program 402 via the same path. NetView program 404 can also display a recommendation made by the problem analysis program 402 to invoke a remote console support facility 44 using remote processor console 16 to obtain additional information about the problem. The authorization response can be made by a high level "authorize service" command as described in copending U.S. patent application entitled "Remote Control of a Computer Processor" filed by A. K. Fitzgerald, C. W. Gainey, Jr., W. K. Kelley and Samuel L. Wentz on Sep. 4, 1990, which patent application is hereby incorporated by reference as part of the present disclosure. Remote console support facility 44 invokes a remote operator facility 42 at local processor console 14 to permit remote operation at remote processor console 16 to interact with problem analysis program 402 to obtain additional information. Such a remote operation can be a type described in copending U.S. patent application Ser. No. 07/575,746 entitled "Remote Operator Facility for a Computer", filed by Mary K. Dangler and Samuel L. Wentz on Aug. 31, 1990, which patent application is hereby incorporated by reference as part of the present disclosure. In the first case, the participation by the central site is complete after the transmission of the response to authorize calling the service engineer. However, in the latter case, the remote operator can then prompt the problem analysis program 402 to further identify the problem and permit the remote operator to remotely view display screens generated by the problem analysis program 402. For example, assume that the diagnostic circuitry at the local processor console originally detected a power supply overheating problem. As a result, the problem analysis program would transmit the probable cause category of "Power Subsystem" with the alert to the central host computer 400 as noted above and also the recommended action of "perform central processor complex problem determination via a remote console session". After receiving the aforesaid information, the NetView operator at the central host computer will initiate the remote operator session as described above and prompt the problem analysis program 402 to display a recommended test which is most likely to identify the actual problem. In this example, the problem analysis program 402 will display "ambient heat problem" which display will be presented on the local processor console screen and the remote processor console screen as described above. In response, the remote operator can make an oral telephone call to the local site to a person (user, owner, janitor, etc.) and ask the person to check the ambient temperature in the room in which the local processor console is located. If the local person responds that the ambient temperature is within the specified temperature range, then the remote operator can direct the local processor console 14 to place a call to a service engineer. However, if the ambient temperature is too hot, the node person can take local action to correct the ambient temperature without the costly need for a service engineer.

Figure 2B:
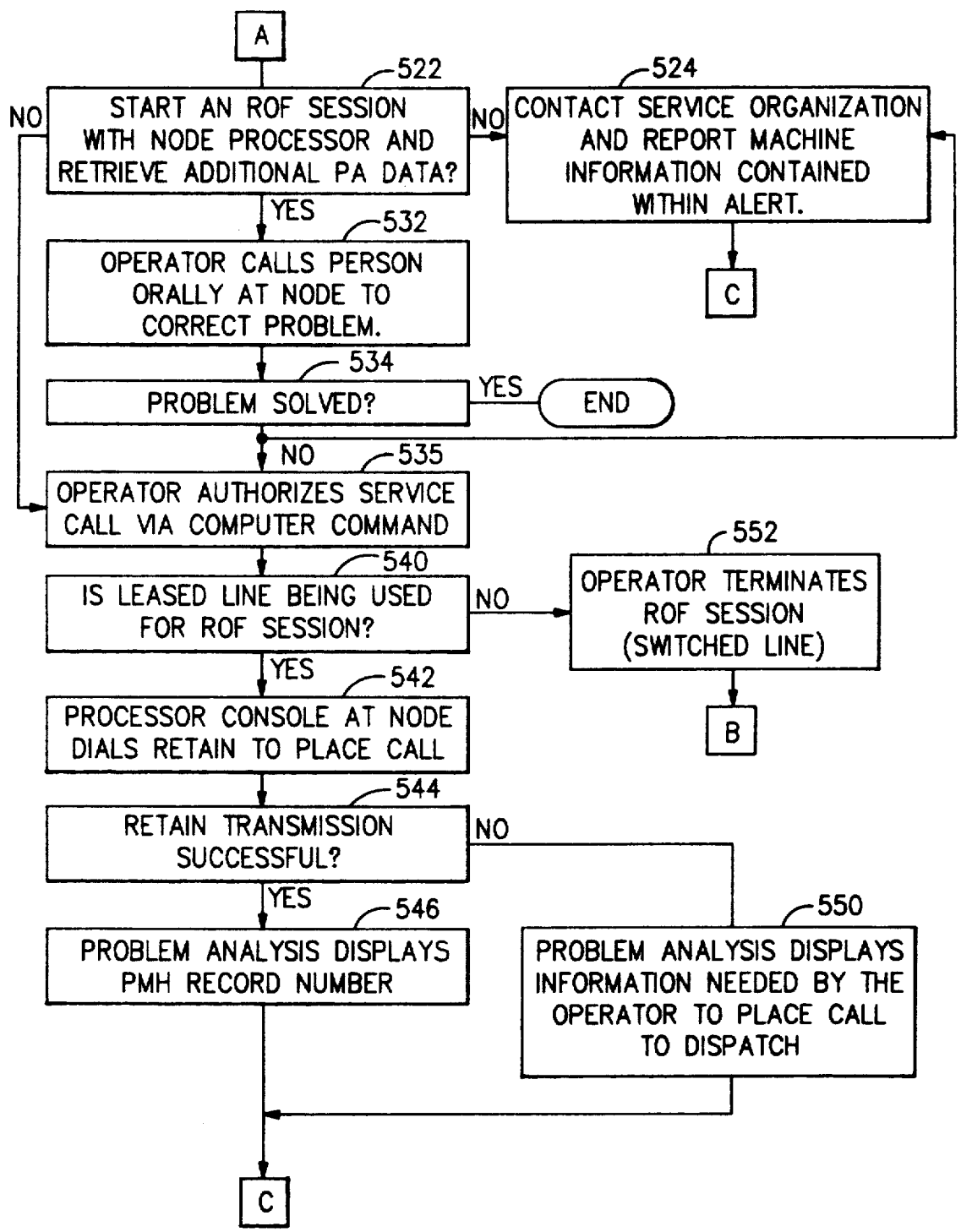
FIGS. 2(a)A, 2(a)B and FIGS. 2(a-c) form a flow chart illustrating an implementation and operation of the network of FIG. 1 to analyze a problem of a node computer with assistance from a central site.
Figure 2C:
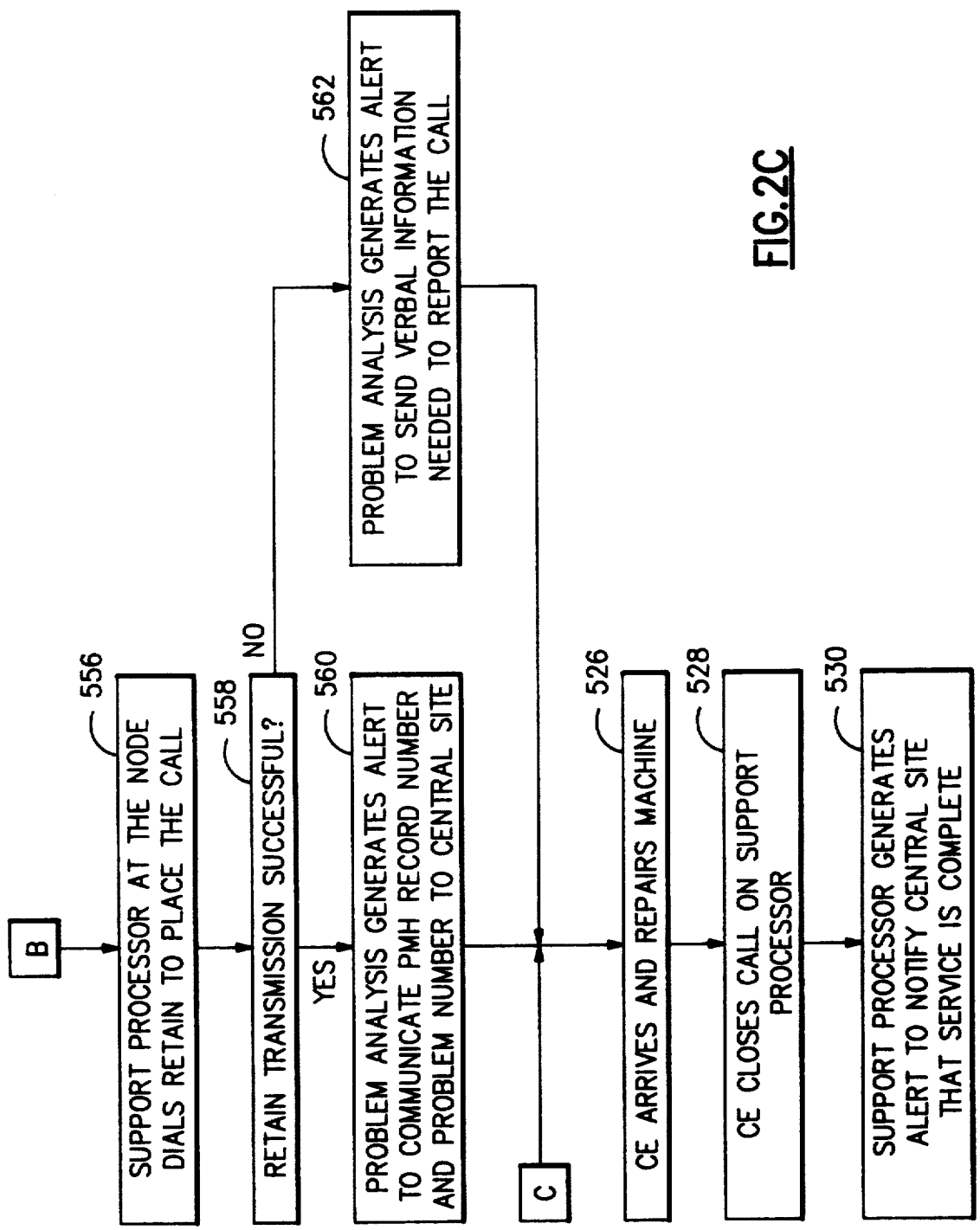

FIG. 2 illustrates in more detail the aforesaid process for analyzing a problem with assistance from the central site. Initially, a diagnostics circuit or program detects an error condition such as a loss of power, resource or system damage machine check, disabled wait, or parity error, and logs the error condition to LPC 14 (step 500). FIG. 3 illustrates the diagnostics circuitry that detects the problems. Parity checkers 700 checks the parity of data generated by processing unit 702, memory 704, channels 706 (channel control check), and I/O processors 708-711. Power sensors 712 check the voltage(s) supplied by power subsystem 714. A disabled wait register 720 stores a "wait" code written by a program 722 when the program 722 has encountered an unrecoverable condition. The error signals corresponding to each of these errors are transmitted to problem analysis program 402 via LPC interface 724. In response to the detected error, problem analysis program 402 is automatically invoked (step 502). Then, a problem determination (PD) routine within problem analysis program 402 analyzes the processor error condition to determine the data for subvectors SV92, SV93, SV94, SV95, SV96, and SV97 (step 503). Subvector SV93 indicates the probable cause category and subvectors 94-97 including SF 82-29 indicate the failing part number. Then, problem analysis program 402 runs and determines if it should generate an alert for transmission to central site 400 (decision block 504). If problem analysis program 402 is running in an isolated processor, then step 504 leads to step 508 in which the event is logged and reported to the local operator. However, whenever the problem emanates from a node processor i.e. one for which access to central site 392 is available, problem analysis program 402 determines in decision block 504 that an alert and the accompanying information should be generated. Thus, in the illustrated network, decision block 504 leads to step 506. In step 506, problem analysis program 402 actually generates the alert and accompanying information as follows. In step 600, a results analysis portion 584 (FIG. 4) of problem analysis program 402 determines if additional information is required for a central site operator from the node via the remote operation (and possibly from the node person also) to solve the problem. This decision is based on the nature of the problem. For example, as noted above, if the problem is a power subsystem failure and the temperature sensors at node computer 12 indicate high temperature, then results analysis program 584 requires more information from the node via the remote operation to assist the central site operation in determining if the temperature sensor is working properly (i.e. by checking the room temperature). As another example, if the problem emanates from an I/O processor expansion unit, then the results analysis program requires more information to determine whether the problem is in fact a malfunctioning I/O processor expansion unit that requires attention by a service engineer or whether the problem is easily correctable such that a node person who is unskilled in service engineering or operations can correct the problem. For example, if the problem is due to a power switch being in the off position instead of the on position, then the node person who is unskilled in service engineering and operations can simply correct the problem after oral instruction from the central site. As another example, assume that power is lost to the local processor console and the node computer. When power is restored, a "power subsystem" alert will be sent to the central site. The recommended action is to use the remote operation (i.e. remote console support and remote operation facility) to obtain additional information because the problem could be due to an electrical storm which has subsided without any permanent damage to the power subsystem. The additional information provided by the remote operation indicates loss of power that could be due to an external power loss. The screen requests a node person to check whether there has been an external power loss. If there has been an external power loss, then a service call is not required, and jobs can be restarted. However, if there has not been an external power loss, then a service engineer should be called. As another example, assume that operating system 414 is unable to continue operations i.e. a "disabled wait state". In this case, the probable cause category is "Undetermined" and the recommended action is to initiate remote operations. When the remote session is established, the problem analysis program will display:

"The system is in a disabled wait state. The wait state was detected at: (TIME)"

"The disabled wait program status word is: (WORD)"

"There were input/output (I/O) events preceeding the disabled wait that may be related to the disabled wait. (I/O FAILURE LIST)

Problem analysis may be performed at your convenience.

To perform Problem Analysis, select 'Analyze' on the System Monitor action bar.

The system is not operating."

After reading this display screen at RPC16, the remote operator can then analyze the I/O failure list, and can perform further problem analysis and take proper action depending on the cause of failure.

The following is a list of actual messages from display screens generated by the problem analysis program and displayed at both LPC 14 and RPC16 to provide the additional information to the remote operator:

"A power failure on one of the secondary racks has been detected at:

Verify that the 'Unit Emergency Power Off' switches on all of the secondary racks are in the 'On' position. If all of the switches are in the 'On' position, then service is required."

"A failure in the channel subsystem has been detected at:

The channel subsystem is still operational but its performance may be degraded.

Jobs may have failed as a result of this problem.

Restart any jobs that failed."

"A channel subsystem failure has occurred. Your system may still be operational. Analysis may be performed at your convenience.

Record the following information. It will be needed to accurately perform Problem Analysis.

To perform analysis select Start Problem Analysis from the Task Selection screen and use the following information.

Time of error:

Date of error:

Channel: (Channel #)"

"A format error of the Program Status Word has occurred during the load at:

Load channel address:

Load device address:

Verify the following: The load device address is correct. The load mode matches the load data source. The load data source is correct.

Re-load the system. Report this message to the person in charge of maintaining your software.

If you suspect a hardware problem, then request service."

"A load error has occurred at:

No response was detected from the load unit address.

Load channel address:

Load device address:

Verify that the load unit address is correct. Ensure that the control unit and device are powered on and enabled.

Re-load the system.

If you suspect a hardware problem, then request service."

"The Processor Console was unable to communicate with the processing unit at:

The processing unit is not powered on. Verify that the 'Unit Emergency Power Off' switch on the primary rack is in the 'On' position. Check to see if there have been any external power outages or disturbances. If the switch is in the 'On' position and there have not been any external power problems, then service is required."

"The Processor Console was unable to communicate with the processing unit at:

There may be a problem with the cable that connects the Processor Console to the processing unit. Check the cable which connects the Processor Console to the primary rack. If there is not a cable connection problem, then service is required."

"Remote or timed power-on did not complete at:
The keylock must be in the Normal or Auto position. Place the keylock in the desired position and try the operation again."

"Manual power-on did not complete at:
The keylock must be in the Manual or Normal position. Place the keylock in the desired position and try the operation again."

"A power problem was detected at:
Power on the processor. Restart any jobs that failed. Check to see if there have been any external power outages or disturbances. If there have not been any external power problems, then service is required.
Note: An automatic restart would have been attempted if it had been enabled. If you want the automatic restart feature enabled, place the keylock in the Normal or Auto position."

"A channel control units did not complete power-on at:
Service is required. Your system may still be operating if these channels are not being used."

"The system has detected high room temperature, and has powered down the processor at:
The processor should not be powered-on until the problem causing the high room temperature has been corrected.
If the room temperature is not high, then service is required."

"The alternate external power source is now being used because of a problem detected with the primary external power source at:
The primary external power source should be checked to determine the cause of the problem.
Restart any jobs that may have failed due to possible power disturbances."

"A rack power problem has been detected at:
The rack power supply has restarted automatically. Restart any jobs that failed. Check to see if there have been any external power outages or disturbances. If there have not been any external power problems, then service is required."

In summary, additional information is required from the node person whenever it is possible that the problem could be corrected by the node person who is not highly skilled in service engineering or operations. Conversely, additional information is not required if it is very unlikely that the problem can be corrected by a person who is not skilled in service engineering such as when the problem is due to a circuit failure. The following table indicates for which actual problems is additional information/remote operations of remote console support and remote operator facility required, and for which actual problems is additional information/remote operations of remote console support and remote operator facility not required. In the latter case, the recommended action is to call a service engineer.

| ACTUAL PROBLEM | PROBABLE CAUSE CATEGORY | IS ADDITIONAL INFORMATION REQUIRED? |
|---|---|---|
| Hardware Parity Error | Processor | No |
| I/O Not Available | " | Yes |
| Program Problem | " | No |
| Logic Error | " | No |
| Vector Processor | " | No |
| Hardware Parity Error | Vector Processor | No |
| Program Problem | " | No |
| Logic Error | " | No |

-continued

| ACTUAL PROBLEM | PROBABLE CAUSE CATEGORY | IS ADDITIONAL INFORMATION REQUIRED? |
|---|---|---|
| External Power Loss | Power Subsystem | Yes |
| Power Supply Hardware Failure | " | No |
| Switch in Wrong Position | " | Yes |
| Malfunctioning Memory | Storage | No |
| Tape & Disk Not Inserted | Service Processor (LPC 14) | Yes |
| Hardware Error | Service Processor (LPC 14) | No, LPC may be down |
| Program Error | Service Processor (LPC 14) | No, LPC may be down |
| Interface Problem | Channel Subsystem | Yes |
| Hardware Problem | " | No |
| Program Problem | " | No |
| No Power to Channel Hardware | " | Yes |
| Switch in Wrong Position | Input/Output Device | Yes |
| Unplugged | " | Yes |
| Hardware Failure | " | No |
| Power Failure | " | Yes |
| Hardware Failure | Initial Program Load | No |
| IPL Storage Device Problem | " | Yes |
| Channel Problem | " | Yes |
| Program Problem | " | Yes |
| Cannot Contact Retain Service | Connection Not Established | No, request service through central site. |
| Disabled Wait | Undetermined | Yes |

If additional information is not required, then decision block 600 leads to decision block 602 in which the results analysis program determines if a communication link 603 to the Retain service is available. If so, then results analysis program generates the alert with the recommended action defined in SF81, 30E0 i.e. "provide remote service call authorization for (SF83 product text)" (step 604). It should be noted that the alert accompanying this recommendation does not include the failing part number(s) because the service call will be made electronically from the node. Referring again to decision block 602, if the Retain link is not available, then the results analysis program generates the alert with the recommended action in this case defined by subfields 30E1, 30A0 and 32A0 i.e. "contact service representative for (SF83 product text)", "dial (SF82-D4)" and "report the machine information:, " and "report the following SF82," respectively. It should be noted that the information accompanying this alert includes the failing part number because the service call will be made orally by a person at the central site who will relay the failing part number to the service organization. It should be noted that in the majority of instances, the failing part number(s) is not sent to the central site. Only when the Retain link is not available from the node is the failing part number(s) sent to the central site so that the central site operator can orally telephone a service organization.

Referring again to decision block 600, if additional information is required, then the results analysis program generates the alert with the recommended action defined by subfield 00D3 i.e. "perform (SF82-7A) problem determination via a remote console session" (step 610). If the communication path through the SCLPI, the local CEC 12 and the leased/switched line 410 is available, then the alert and accompanying information are routed through this path to avoid the telephone charge (decision block 510 and step 512). Otherwise, the alert is routed through the switched telephone line 412 via the APPI under the Communication Manager program, SDLC and modem 436 (step 516).

After either of steps 514 or 516, NetView program 404 reads the alert and accompanying information. It should be noted that the NetView program 404 can be customized by the user with a CLIST or EXEC program 405 before installation to respond to any or all of the alerts in a manner based on a vector contained in the alert information. In the illustrated embodiment, NetView program 404 has been programmed to automatically respond to those alerts which recommend use of a service engineer. When such an alert is received, decision blocks 518 and 519 lead to step 520 in which NetView program 404 executes the "CLIST" or an "EXEC" program 405, to automatically return an "authorize service" command to problem analysis program 402 to authorize the use of the service engineer and/or display the recommended action. The CLIST program is as follows:

```
AUTHREQ CLIST
&CONTROL ERR
(C) COPYRIGHT IBM CORP. 1990
DESCRIPTION:    This CLIST performs the required
                operations to send the RUNCMD that
                authorizes service for the remote
                processor.
&WRITE
&WRITE          AUTHREQ
&WRITE
Check for valid number of parms
&IF &PARMCNT LT 2 &THEN &GOTO -PARMCHK
Save the parms passed to CLIST
&PARMS = &PARMSTR
Parse PARMS and select appropriate system to issue
service request
PARSEL3R PARMS APPL INCID REST
Set up checks to determine if the system name is one
that we want to authorize. Also, set the ID used by
the VARY command to communicate with the correct phone
line and system.
&ID = '???'
&IF &APPL EQ 'TARGETSP' &THEN &ID = 'T7C'
&IF &APPL EQ 'TARGETSP' &THEN &SP = 'S32B90P4'
If ID is '???' then we did not find a system that we
can authorize &IF &ID EQ '???' &THEN &GOTO -INVALID
-LINACT
Inactivate ID so we can auto-dial remote system
&WROTE --- Reset line
&WAIT 'INACT &ID', IST1051=-LACT, *ERROR=-ERROR
-LACT
Inactive ID so we can auto-dial remote system
&WRITE --- Dial phone
&WAIT 'V NET,ACT,IF=&ID,LOGON=&APPLID',IST5981=-
AUTHSVCE,*ERROR=-ERROR
-AUTHSVCE
Execute authorize service RUNCMD for remote system
&WRITE
&WRITE          Authorize Service for Resource: &APPL
&WRITE                                      PU: &SP
&WRITE                                      ID: &ID
&WRITE                          Problem Number: &INCID
&WRITE
RUNCMD   SP=&SP APPL=&APPL CLISTVAR=YES +
         DAN(OCFCMD) +
         SERVICE +
            AUTH(OKOK) +
            STYPE(ROSTSVC) +
            INCIDENT(&INCID)
&WRITE Return message from system &APPL: &DSIRUN001
&WRITE --- Hangup phone
&WAIT 'INACT &ID',IST1051=-THIRD,*ERROR=-ERROR
-THIRD
&WRITE --- Reset line
&WAIT 'ACT &ID',IST0931=-END,*ERROR=-ERROR
&GPTP -END
-INVALID
&WRITE Invalid resource name entered: &APPL
&EXIT
-PARMCHK
&WRITE
&WRITE    INVALID NUMBER OF PARMS ENTERED.
&WRITE    Correct syntax is.........AUTHREQ resource
          problem
&WRITE
&WRITE    where:
&WRITE    resource  ==   The name of the resource that sent
                         the ALERT.
&WRITE    problem   ==   The unique problem number
                         associated with the alert. It is
                         the first 4 bytes defined in the
                         MESSAGE CODE.
&WRITE
&EXIT
-END
&WRITE Ended normally ..............
&EXIT
-ERROR
&WRITE Ended with an ERROR ..............
&EXIT
```

Another CLIST or EXEC program could be provided to both display the alert and return the command. Program 405 is called in the following manner. When the central site receives the Alert built in step 604 and sent in step 514 or 516, the return program 404 reads the recommended action Subfield SF81 which recommends "provide remote service call authorization . . . ", and executes the program 405.

The form of the return command can be that described in the aforesaid copending patent application entitled "Remote Control of a Computer Processor" by Fitzgerald et al.

If the program 405 is not provided, then NetView program 404 (by default) automatically displays the alert (step 523). Then the central site operator can either proceed to step 522 described below or orally call the service engineer (step 525).

If the recommended action was not to use a service engineer, then decision block 518 leads to step 522 in which NetView program 404 causes a display on NetView display console 51 of the alert and accompanying information i.e. probable cause category and recommended action. Then, the central site operator starts a remote operating session with remote operator facility 42 at the node and prompts problem analysis program 402 to display additional data i.e. a refinement on the probable cause and a recommended test such as to check a power switch or check the ambient temperature at node 12 (step 522). After this additional problem analysis data is displayed and read by the central site operator, the central site operator while in this remote operator session can authorize a service call by entering an "authorize service" command selection through an RPC keyboard 819 which then transmits the selection to the local processor console 14. The local processor console then sends the service information, for example, failed parts and machine ID, to Retain facility. The central site operator also has an option to telephone orally a service organization and report the service information (step 524). After a service call, the service engineer should arrive at the node 14 and make the repair (step 526) and close the call on local processor console 14 (step 528). In response to the closing call, problem analysis program 42 generates a problem resolution vector to notify NetView program 404 that service has been completed (step 530).

It should be understood that in most cases, after the central site operator reads the additional problem analysis information in step 522, the central site operator makes an attempt to solve the problem without contacting the service engineer and incurring the expense of a service call. Thus, usually step 522 leads to step 532 in which the central site operator calls a person at node 14 such as a user, owner or janitor to attempt to correct the problem. For example, if the additional problem analysis information indicates an overheating problem, the central site operator can call the person at node 14 and ask the person to check the room temperature, and if the room temperature is too high, correct the problem without calling a computer service engineer.

It should be noted that the aforesaid procedure for providing the problem analysis information in two steps, first the probable cause category direct transmission and then the use of the remote console support and remote operator facility to obtain a display of additional information, avoids the need to update the NetView program 404 every time that the problem analysis program 402 is updated to identify a new type of problem. According to the aforesaid procedure, when the problem analysis program is updated to identify a new type of problem, the new type of problem is grouped with an (old) type of problem in a preexisting probable cause category that has the same recommended action and similar subject matter, and the remote console support and remote operator facility session is used to further define the problem. If the problem is solved in step 532, then decision block 534 is conclusive. Otherwise, the central site operator can either make an oral telephone call directly to a service engineer and provide the additional information (i.e. failed part number) in step 524 or make the call via node 14 electronically in step 538. Such an electronic call can be made by sending a service command to node 14 as described above.

If the switched line 412 is being used for the remote operator facility session (decision block 540), then the service call request is queued by problem analysis program 402, and problem analysis program 402 automatically dials the Retain service to place the service engineer call once the remote operator session ends (step 542). In the illustrated embodiment, the service is designated as "Retain" service which is a service provided by IBM Corp. If the "Retain" transmission is successful, the "Retain" service will return an acknowledgment in the form of a problem management hardware (PMH) record number, and decision block 544 leads to step 546 in which problem analysis program 402 will send a problem resolution vector to the central site acknowledging the successful service call and including the PMH number. Then, steps 526, 528 and 530 are implemented as noted above. However, if the "Retain" transmission was not successful, decision block 544 leads to step 550 in which problem analysis program 402 transmits information to central site 400 for display, which information enables the central site operator to place the telephone call orally.

Referring again to decision block 540, if the remote operator facility session initiated in step 522 utilizes the switched telephone line 412, then the central site operator can terminate the remote operator facility session and authorize the service call via leased/switched telephone line 410 and local CEC (step 552). Then, problem analysis program 402 dials the "Retain" service to place the call (step 556). If the transmission is successful as noted above (decision block 558), the "Retain" service transmits an acknowledgement, and decision block 558 leads to step 560 in which problem analysis program 402 generates a problem resolution vector to communicate the PMH record number and the problem number to the central site. However, if the retain transmission is not successful, decision block 558 leads to step 562 in which problem analysis program 402 generates another alert to the central site and the necessary information to enable the central site operator to report the call directly. After either of steps 560 or 562, steps 526, 528 and 530 are implemented as described above.

The following is a list of alerts with the possible combinations of subvectors and subfields providing the accompanying information:

| Processor Machine Check | |
|---|---|
| Alert Description | CPC HARDWARE FAILURE |
| Probable Causes | PROCESSOR |
| User Causes | None |
| Install Causes | None |
| Failure Causes | PROCESSOR MACHINE CHECK |
| Recommended Action | Determined by the scenario described under SF81 subfield and step 506. |
| System Checkstop | |
| Alert Description | CPC HARDWARE FAILURE |
| Probable Causes | PROCESSOR |
| User Causes | None |
| Install Causes | None |
| Failure Causes | SYSTEM CHECKSTOP |
| Recommended Action | Determined by the scenario described under SF81 subfield and step 506. |
| Vector Processor Problem | |
| Alert Description | CPC HARDWARE FAILURE |
| Probable Causes | VECTOR PROCESSOR |
| User Causes | None |
| Install Causes | None |
| Failure Causes | VECTOR PROCESSOR |
| Recommended Action | Determine by the scenario described under SF81 subfield and step 506. |
| Power Problem | |
| Alert Description | CPC HARDWARE FAILURE |
| Probable Causes | POWER SUBSYSTEM |
| User Causes | None |
| Install Causes | None |
| Failure Causes | POWER SUBSYSTEM |
| Recommended Action | Determined by the scenario described under SF81 subfield and step 506. |
| Storage Problem | |
| Alert Description | CPC HARDWARE FAILURE |
| Probable Causes | STORAGE |
| User Causes | None |
| Install Causes | None |
| Failure Causes | STORAGE |
| Recommended Action | Determined by the scenario described under SF81 subfield and step 506. |
| Service Processor Problem | |
| Alert Description | CPC HARDWARE FAILURE |
| Probable Causes | SERVICE PROCESSOR |
| User Causes | None |
| Install Causes | None |
| Failure Causes | SERVICE PROCESSOR |
| Recommended Action | Determined by the scenario described under SF81 subfield and step 506. |
| Channel Problem in System 370 Mode | |
| Alert Description | CPC HARDWARE FAILURE |
| Probable Causes | CHANNEL SUBSYSTEM |
| User Causes | None |
| Install Causes | None |

-continued

| | |
|---|---|
| Failure Causes | CHANNEL SUBSYSTEM FAILURE OCCURRED ON CHANNEL ADDRESS number |
| Recommended Action | Determined by the scenario described under SF81 subfield and step 506. |

Channel Path Problem in IBM VM/ESA Operating System Mode

| | |
|---|---|
| Alert Description | CPC HARDWARE FAILURE |
| Probable Causes | CHANNEL SUBSYSTEM |
| User Causes | None |
| Install Causes | None |
| Failure Causes | CHANNEL SUBSYSTEM FAILURE OCCURRED ON CHANNEL PATH ID number |
| Recommended Action | Determined by the scenario described under SF81 subfield and step 506. |

Channel Problem With a Device in System 370 Mode

| | |
|---|---|
| Alert Description | CPC HARDWARE FAILURE |
| Probable Causes | CHANNEL SUBSYSTEM |
| User Causes | None |
| Install Causes | None |
| Failure Causes | CHANNEL SUBSYSTEM FAILURE OCCURRED ON CHANNEL ADDRESS number FAILURE OCCURRED ON DEVICE ADDRESS number |
| Recommended Action | Determined by the scenario described under SF81 subfield and step 506. |

Channel Problem With a Device in ESA Mode

| | |
|---|---|
| Alert Description | CPC HARDWARE FAILURE |
| Probable Causes | CHANNEL SUBSYSTEM |
| User Causes | None |
| Install Causes | None |
| Failure Causes | CHANNEL SUBSYSTEM FAILURE OCCURRED ON CHANNEL PATH ID number FAILURE OCCURRED ON DEVICE NUMBER number |
| Recommended Action | Determined by the scenario described under SF81 subfield and step 506. |

IPL Failure In System 370 Mode

| | |
|---|---|
| Alert Description | CPC HARDWARE FAILURE |
| Probable Causes | INITIAL PROGRAM LOAD |
| User Causes | None |
| Install Causes | None |
| Failure Causes | FAILURE OCCURRED ON CHANNEL ADDRESS number FAILURE OCCURRED ON DEVICE ADDRESS number |
| Recommended Action | Determined by the scenario described under SF81 subfield and step 506. |

IPL Failure in ESA Mode

| | |
|---|---|
| Alert Description | CPC HARDWARE FAILURE |
| Probable Causes | INITIAL PROGRAM LOAD |
| User Causes | None |
| Install Causes | None |
| Failure Causes | FAILURE OCCURRED ON CHANNEL PATH ID number FAILURE OCCURRED ON DEVICE NUMBER number |
| Recommended Action | Determined by the scenario described under SF81 subfield and step 506. |

Hard Wait Detected

| | |
|---|---|
| Alert Description | CPC ENTERED HARD WAIT |
| Probable Causes | UNDETERMINED |
| User Causes | None |
| Install Causes | None |
| Failure Causes | None |
| Recommended Action | Determined by the scenario described under SF81 subfield and step 506. |

I/O Error In 370 Mode

| | |
|---|---|
| Alert Description | CPC HARDWARE FAILURE |
| Probable Causes | INPUT/OUTPUT DEVICE |
| User Causes | None |

-continued

| | |
|---|---|
| Install Causes | None |
| Failure Causes | INPUT/OUTPUT DEVICE FAILURE OCCURRED ON CHANNEL ADDRESS number FAILURE OCCURRED ON DEVICE ADDRESS number |
| Recommended Action | Determined by the scenario described under SF81 subfield and step 506. |

I/O Error in IBM VM/ESA Operating System Mode

| | |
|---|---|
| Alert Description | CPC HARDWARE FAILURE |
| Probable Causes | INPUT/OUTPUT DEVICE |
| User Causes | None |
| Install Causes | None |
| Failure Causes | INPUT/OUTPUT DEVICE FAILURE OCCURRED ON CHANNEL PATH ID number FAILURE OCCURRED ON DEVICE NUMBER number |
| Recommended Action | Determined by the scenario described under SF81 subfield and step 506. |

Unsuccessful Call Report

| | |
|---|---|
| Alert Description | CENTRAL PROCESSOR COMPLEX (CPC) PROBLEM |
| Probable Causes | CONNECTION NOT ESTABLISHED |
| User Causes | None |
| Install Causes | None |
| Failure Causes | CONNECTION NOT ESTABLISHED |
| Recommended Action | DIAL TELEPHONE NUMBER number AND REPORT THE MACHINE INFORMATION REPORT THE FOLLOWING PROBLEM TYPE (problem type) REPORT THE FOLLOWING PROBLEM NUMBER (problem number) REPORT THE FOLLOWING MESSAGE CODE (message code) |

Multiple Channel and Device Problems

| | |
|---|---|
| Alert Description | CPC HARDWARE FAILURE |
| Probable Causes | CHANNEL SUBSYSTEM |
| User Causes | None |
| Install Causes | None |
| Failure Causes | CHANNEL SUBSYSTEM |
| Recommended Action | PERFORM (SF82-D4) PROBLEM DETERMINATION VIA A REMOTE CONSOLE SESSION |

Problem Resolution Vectors

Successful Call Report

| | |
|---|---|
| Description | SERVICE/REPAIR INFORMATION |
| Probable Causes | UNDETERMINED |
| User Causes | SERVICE CALL SUCCESSFULLY PLACED: PROBLEM NUMBER number |
| Install Causes | None |
| Failure Causes | None |
| Recommended Action | NO ACTION NECESSARY |

End of Call Notification

| | |
|---|---|
| Description | SERVICE/REPAIR INFORMATION |
| Probable Causes | UNDETERMINED |
| User Causes | SERVICE COMPLETE: PROBLEM NUMBER number |
| Install Causes | None |
| Failure Causes | None |
| Recommended Action | NO ACTION NECESSARY |

In each of the above examples, the "Alert Description" field is the Subvector SU92, the "Probable Causes" field is the Subvector SU93, the "User Causes" field is the Subvector SU94, the "Install Causes" field is Subvector SU95, the "Failure Causes" field is the Subvector SU96 with Subfield SF01, and the "Recommended Action" field is the Subvector SU96 with Subfield SF81.

FIG. 4 illustrates processing by the problem analysis program 402 of FIG. 2. Problem analysis program 402 automatically invokes a problem determination (PD) routine (step 580) after the error was detected in step 500. Then, the PD routine analyzes the problem and writes alert data into a file 582, which alert data is required to generate the aforesaid alert. The alert data comprises the data necessary to fill in the subvectors and subfields described above. Next, results analysis program portion 584 of problem analysis program 402 is invoked, and because the error originated from node 14, determines that an alertable condition exists and invokes an alert generation portion 586 of problem analysis program 402. Then, the alert generation program makes an entry in an alert request queue 590 for the current problem, and returns control to results analysis program 584. Then, a queue monitor converts the request corresponding to the current problem to an alert format. FIG. 5 illustrates by example, the format of an alert 800. This example is a power subsystem failure where the recommended action is to authorize service. The queue monitor is also responsible for routing the alert to the correct path.

Based on the foregoing, apparatus and processes embodying the present invention have been disclosed. However, numerous modifications and substitutions can be made without deviating from the scope of the invention. Therefore, the invention has been disclosed by way of example and not limitation, and reference should be made to the following claims to determine the scope of the invention.

We claim:

1. A method for analyzing a problem with a first computer, said method comprising the steps of:
   detecting a problem at said first computer;
   running a program on a second computer to analyze the problem;
   sending a notification of said problem to a third, remote computer, said notification including a probable cause category encompassing said problem and a recommendation, said recommendation being to call a service engineer if the problem requires expertise or resources of the service engineer to correct, and being to establish remote access on site at said third computer of said program to obtain additional information relating to the cause of said problem if at least a reasonable chance exists that said problem can be corrected by a person at said first computer which person not having service engineering expertise or resources; and using said third computer to remotely control said program to obtain additional information relating to the cause of the problem if at least a reasonable chance exists that said problem can be corrected by a person at said first computer which person not having service engineering expertise or resources.

2. A method as set forth in claim 1 wherein after said step of remotely controlling said program, performing the step of making an oral communication by telephone to a person on site at said first and second computers to conduct a test or inspection to determine the cause of said problem based on said additional information.

3. A method as set forth in claim 1 wherein said additional information includes a recommended test or inspection to determine the cause of the said problem.

4. A method as set forth in claim 1 wherein said additional information narrows the probable cause of said problem within said probable cause category.

5. A method as set forth in claim 1 wherein said recommendation is to establish said remote control of said program running on said second computer.

6. A method as set forth in claim 1 wherein said recommendation is to call the service engineer to said first computer.

7. A method as set forth in claim 6 wherein another program runs on said third computer and automatically responds to said recommendation to call said service engineer, said other program being programmable to respond to said recommendation to authorize said second computer to call said service engineer and programmable to alert an operator at said third computer without authorizing said call to said service engineer.

8. A method as set forth in claim 7 wherein said program is programmable to automatically respond to said recommendation by directly calling a service engineer to said first computer.

9. A method as set forth in claim 1 wherein said remote control of said program running on said second computer includes the step of displaying screens on site at said third computer, said display screens being generated by said program and providing said additional information.

10. A method as set forth in claim 1 further comprising the step of running said program to identify a part which is the probable cause of said problem.

11. A method as set forth in claim 10 wherein said identification of said part is stored in said second computer and is not sent with said notification for use by said third computer.

12. A method as set forth in claim 6 wherein said second computer responds to said authorization to call said service engineer by transmitting to a service engineer dispatch facility an identification of a part which is the likely cause of said problem.

13. A method as set forth in claim 1 wherein said problem was or is due to a power loss external to said first computer, and said recommendation is to establish remote access on site at said third computer to obtain additional information relating to the cause of said problem.

14. A method as set forth in claim 1 wherein said problem is due to defective hardware, and said recommendation is to call a service engineer.

15. A method as set forth in claim 1 wherein said problem is due to a switch being in a wrong position, and said recommendation is to establish remote access on site at said third computer to obtain additional information relating to the cause of said problem.

16. A method as set forth in claim 1 wherein said probable cause category encompasses a plurality of actual problems.

17. A method as set forth in claim 1 further comprising the steps of:
   updating said program to analyze a different type of problem; and
   grouping said different type of problem within a pre-existing probable cause category, said pre-existing probable cause category encompassing at least one other type of problem that could be analyzed by said program before said update.

18. A computer network for analyzing a problem with a first computer, said network comprising:
   a second computer coupled to said first computer, said second computer including a processor and means for receiving error signals of different types from said first computer;

a third computer remote to said first computer; and means for communicating between said third and second computers; and wherein said second computer further comprises problem analysis means for generating alerts corresponding to the types of error signals received from said first computer and transmitting said alerts to said third computer, each of said alerts including a probable cause category encompassing said problem and a recommendation, said recommendation being to contact a service engineer if the problem requires expertise or resources of the service engineer to correct, and being to establish remote access to said second computer to obtain additional information relating to the cause of said problem if at least a reasonable chance exists that said problem can be corrected by a person at said first computer which person not having service engineering expertise or resources;

said second computer includes means for providing said additional information; and said third computer includes means for remotely controlling said second computer to obtain said additional information relating to the cause of said problem if there is at least a resonable chance that said problem can be corrected by a person at said first computer which person not having service engineering expertise or resources.

19. A computer network as set forth in claim 18 wherein said additional information includes a recommended test or inspection to determine the cause of said problem.

20. A computer network, as set forth in claim 18 wherein said third computer further comprises response means for automatically responding to said recommendation to call said service engineer, said response means being programmable to respond to said recommendation by authorizing said second computer to call said service engineer and being programmable to alert an operator at said third computer of said recommendation without authorizing said second computer to call said service engineer call.

21. A computer network as set forth in claim 18 further comprising said first computer and wherein said first computer includes means for detecting problems within said first computer and generating said error signals for transmission to said second computer.

* * * * *